(12) United States Patent
Jeong (10) Patent No.: US 7,058,417 B2
(45) Date of Patent: Jun. 6, 2006

(54) METHOD FOR INPUTTING ADDRESS OF RECEIVER IN MESSAGING SERVICE

(75) Inventor: Cha-Sup Jeong, Seoul (KR)

(73) Assignee: Samsung Electronics Co., Ltd. (KR)

( * ) Notice: Subject to any disclaimer, the term of this patent is extended or adjusted under 35 U.S.C. 154(b) by 335 days.

(21) Appl. No.: 10/728,484

(22) Filed: Dec. 5, 2003

(65) Prior Publication Data
US 2004/0116105 A1 Jun. 17, 2004

(30) Foreign Application Priority Data
Dec. 11, 2002 (KR) ...................... 10-2002-0078676

(51) Int. Cl.
*H04Q 7/20* (2006.01)
(52) U.S. Cl. ...................... 455/466; 455/564; 455/565; 455/566; 455/550.1; 455/186.1; 715/526; 715/808
(58) Field of Classification Search ................ 455/466, 455/186.1, 550.1, 566, 564–565; 715/526, 715/769, 780, 789, 803, 808
See application file for complete search history.

(56) References Cited
U.S. PATENT DOCUMENTS
5,848,356 A * 12/1998 Jambhekar et al. ......... 455/403
6,405,225 B1 * 6/2002 Apfel et al. ................ 715/526
6,529,717 B1 * 3/2003 Blants et al. ............ 455/186.1
2003/0040327 A1 * 2/2003 Park ........................... 455/466

\* cited by examiner

Primary Examiner—Stephen D'Agosta
(74) Attorney, Agent, or Firm—Diworth & Barrese LLP (57) ABSTRACT

A method for messaging service, e.g. short message service (SMS), in a mobile phone, capable of inputting a phone number of receiver directly into a message editing window. Disclosed is also a computer-readable recording medium including therein a software program for execution of the method. After the user has entered a message, it is determined which type of a direct input is requested by the user for inputting of the address of the receiver in the message editing window. If the requested type determined by the user for the direct input of the address is an input by a look-up (searching) function, it is activated an address look-up window as a new display layer while still activating the message editing window, and inputted the address of the receiver selected by the user directly into the message editing window. Further, if the requested type determined by the user for the direct input of the address is an input by a short key function, the address of the receiver is inputted directly into the message editing window next to the inputted message utilizing the short key, while activating the message editing window.

19 Claims, 7 Drawing Sheets

METHOD FOR INPUTTING ADDRESS OF RECEIVER IN MESSAGING SERVICE

PRIORITY

This application claims the priority to an application entitled "Method For Inputting Address of Receiver In Messaging Service" filed in the Korean Industrial Property Office on Dec. 11, 2002 and assigned the application Ser. No. 2002-78676, the contents of which are incorporated herein by reference.

BACKGROUND OF THE INVENTION

1. Field of the Invention

The present invention relates generally to a mobile messaging service for use in mobile communication terminals, e.g. mobile phones, and more particularly to a method for inputting an address of a predetermined receiver to whom such a message is to be transmitted. The present invention relates further to a computer-readable recording medium provided with a software program embodying the aforementioned method.

2. Description of the Related Arts

Recently, mobile phones have been in common use of many people as one of the necessities of life such as automobiles, wired telephones, etc., owing to their handiness, mobility and convenience in using. Most of the mobile phones in current use are generally designed to provide their users with a variety of convenient additional functions such as telephone number registration (address book), personal schedule management and others. This has now advanced to a kind of an integrated personal information management (PIM) service, as well as conventional telephone call services.

Figure 1A:
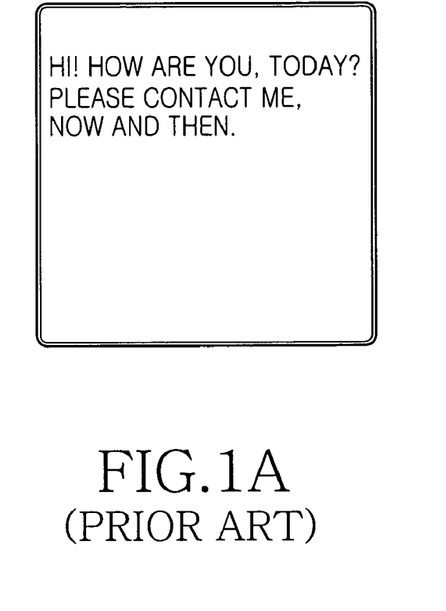
FIGS. 1A to 1D illustrate a series of display windows shown in accordance with a procedure of inputting a phone number of a predetermined receiver upon SMS transmission in a conventional mobile phone.
Figure 1B:
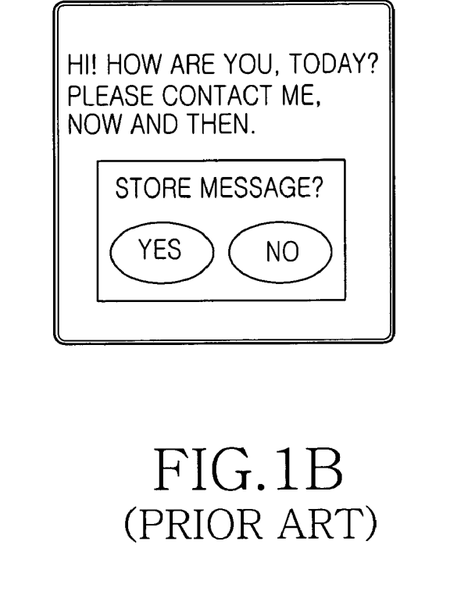
Figure 1C:
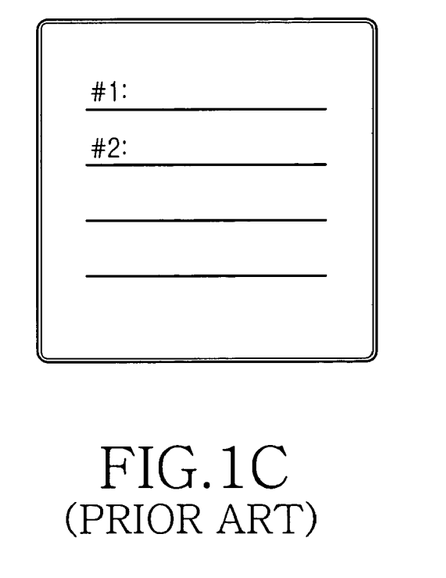
Figure 1D:
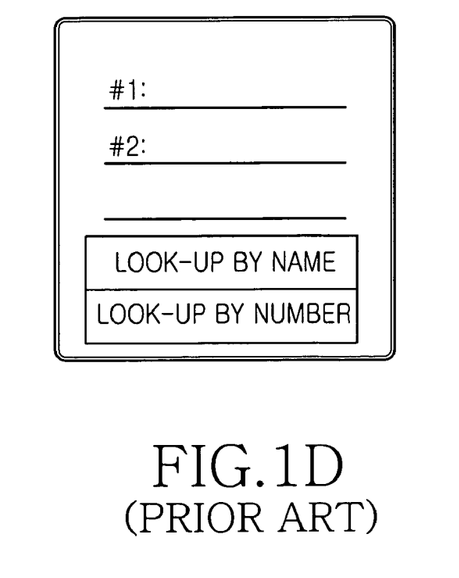

Short Message Service (SMS) may be one of such additional functions most used in mobile phones, which enables wireless transmission of characters and/or alphanumeric messages between a mobile station and a communication network. Referring now to FIGS. 1A to 1D, there are illustrated a sequence of operational steps for inputting a phone number of a predetermined receiver using SMS function in a conventional type of mobile phone. According to the above input procedure for sending an SMS message in the mobile phone, the user inputs a short message reading, for example, "Hi How are you, today? Please contact me now and then", as shown in FIG. 1a. using keypads on the phone. After completing inputting the short message, the user is asked, as shown in FIG. 1b, whether the input message is to be stored in the phone. Then, an input window for telephone numbers of the recipients of the message is activated (FIG. 1C) irrespectively of storing of the input message in FIG. 1b. If the user does not remember a phone number for a certain recipient or called party, then he would be able to use a "Look-up" key function generally provided on the display window, thereby enabling him to search for any selected one of the phone numbers stored in a look-up table of the mobile phone, as shown in FIG. 1D.

Figure 2:
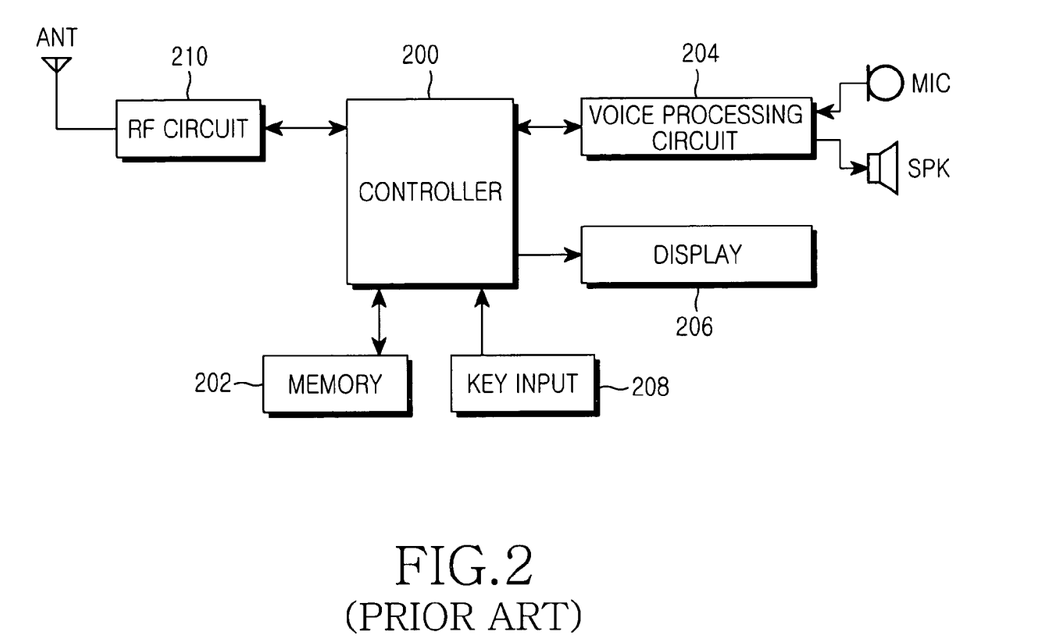
FIG. 2 shows a schematic block diagram of the general circuit arrangement of a conventional mobile phone.

FIG. 2 shows a schematic block diagram of general circuit arrangement of a conventional mobile phone by way of example. Referring now to this block diagram, a controller 200 controls processing of the operations and functions such as telephone calling, mobile Internet accessing, SMS transmitting, etc. A memory 202 electrically connected to the controller includes a Read Only Memory (ROM) for storing a micro-coded program and a set of reference data required for the operation and processing in the controller, a Random Access Memory (RAM) assigned for a working memory of the controller 200, and a flash memory (Flash RAM) providing a memory area assigned for storing various multimedia data and other necessary data subject to frequent updating. A voice processing circuit 204 coupled with the controller 200 provides processing of a telephone calling operation through a microphone and speaker, voice recording, and an alarm for notifying of an incoming call. Display 206 makes a display of various data or information for the user as requested under the control of the controller using the mobile phone. A key input section 208 is comprised of a series of alphanumeric keys and various function keys such as "Menu, Call, Delete, End, Volume, #, *, etc." and provides the controller 200 with key input data corresponding to a specific key depressed by the user. A radio frequency section 210 serves to communicate radio frequency signals with selected base stations on a mobile communication network via antenna.

Figure 3:
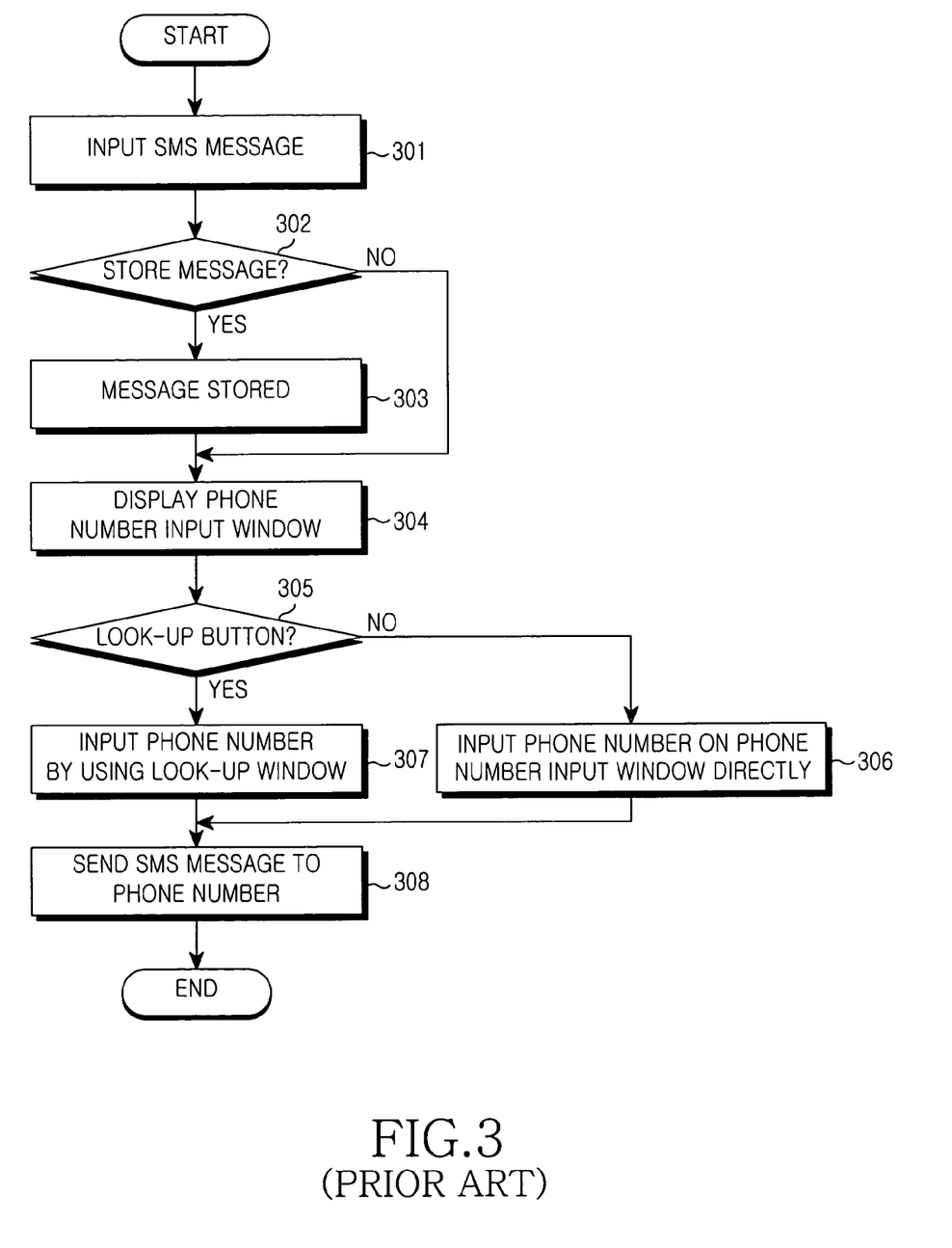
FIG. 3 is a flow chart diagram showing a method for inputting a phone number of a given receiver upon SMS transmission in a conventional mobile phone.

FIG. 3 shows a flow chart for a method for inputting a phone number of a given receiver upon using SMS transmission in a conventional mobile phone. Referring to the flow chart, an SMS message prepared by the user of the mobile phone is inputted in step 301 as shown in FIG. 1A and then it is determined in step 302 whether or not the SMS message is to be stored into a memory. Depending upon a result of the above confirmation, the SMS message is stored into memory in step 303 or a phone number input window is displayed without storing the message in step 304. At this point the user cannot correct or change the inputted SMS message on the phone number input window, since the phone number input window now activated is different from a window for the SMS message. Thus, in order to make any correction or confirmation to the SMS message, the user needs to close the current phone number input window in order to return to the SMS service window and to retrieve the stored message again or re-enter a whole SMS message from the beginning.

Inputting of a specific phone number through the phone number input window is generally carried out in two ways: firstly, inputting of a phone number using the "Look-Up" button as seen in steps 305 and 307, and secondly, inputting of a phone number directly into the phone number input window as shown in step 306. Hence, the SMS message is finally transmitted in step 308 to the phone number inputted (or multiple phone numbers) via either one of the above two ways.

The above-described conventional method of inputting a phone number of a receiver, as shown with reference to FIG. 3, is disadvantageous in that the user of the mobile phone cannot make any correction to the inputted SMS message on the phone number input window. Thus, in order to make any correction or confirmation to the SMS message prior to transmission, the user must close the currently activated phone number input window in order to return to the previous SMS service window and to retrieve the stored message again or re-enter a whole SMS message from the beginning, thereby leading to great inconvenience of the user when using SMS function with the mobile phone.

Furthermore, in a mobile communication service, recently most of mobile subscribers tend to use such an SMS service more frequently and with longer messages. Therefore, there have been a great deal of demands in the state of the art for development of a method for searching or inputting a phone number of more frequent recipients more quickly and efficiently, e.g. by means of utilizing a short-key dialing or memory dialing, upon using the SMS service or a phone calling in the mobile phone.

SUMMARY OF THE INVENTION

It is, therefore, an object of the present invention to provide a method for inputting a phone number of a specific receiver or called party with more ease and convenience, capable of inputting the phone number directly onto a message editing window upon using a messaging service, in particular, e.g. short message service (SMS), in a mobile phone, and a computer-readable recording medium including therein a software program embodying the aforementioned method.

It is another object of the present invention to provide a method for using the messaging service more quickly and conveniently by means of inputting only a few digits of predetermined characters or numerals, e.g. one or two numerals in short keys, on a message editing window, thereby preventing from a trouble of inputting a whole phone number of a specific receiver.

It is still another object of the present invention to provide a method for inputting a desired phone number with a message editing window activated, causing the user to confirm or correct the message with more ease and convenience when using the SMS messaging service.

To achieve the above and other objects, the present invention provides a method for inputting an address of a receiver in a messaging service, comprising the steps of:

(a) determining whether a direct inputting of the address of the message receiver on a message editing window is selected by a user of the messaging service; and (b) if it is determined that the direct inputting of the address in the message editing window has been selected, as a result of the execution in the step (a), entering the address of the message receiver directly into the message editing window activating with the message editing window activated.

According to a second aspect of the present invention, there is provided a method for inputting an address of a receiver in a messaging service, comprising the steps of:

(a) after a user of the messaging service has entered a message, determining which type of a direct input is requested by the user for inputting of the address of the receiver in a message editing window;

(b) if the requested type determined in the step (a) by the user for the direct input of the address is an input by a look-up (searching) function, activating an address look-up window as a new display layer while still activating the message editing window, and inputting the address of the receiver selected by the user directly into the message editing window; and (c) if the requested type determined in the step (a) by the user for the direct input of the address is an input by a short key function, causing the address of the receiver to be inputted directly into the message editing window subsequently to the inputted message utilizing the short key, while still activating the message editing window.

According to another aspect of the invention, there is provided a computer-readable recording medium including a control program for use in a messaging service system provided with a processor, the control program being adapted to execute a first function for confirming whether a selection is made to a direct inputting of an address of a message receiver in a message editing window, and a second function for allowing a user to enter an address of a message receiver directly into a message editing window with the message editing window activated, if it is determined that the selection was made to the direct inputting of the address of message receiver in the message editing window.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Now, a preferred embodiment of the present invention will be described herein below with reference to the accompanying drawings, in which most of the description will be made, by way of example, for an embodiment of a short message service (SMS) that is currently one of the most frequently used messaging services in the mobile communication services. However, it should be appreciated that the invention is not intended to be limited to such an SMS application, but may be likewise applicable to MMS (multimedia messaging services), or electronic mailing service. Further, in the following description, well-known functions or constructions will not be described in detail when they are well-known in the art.

Figure 4:
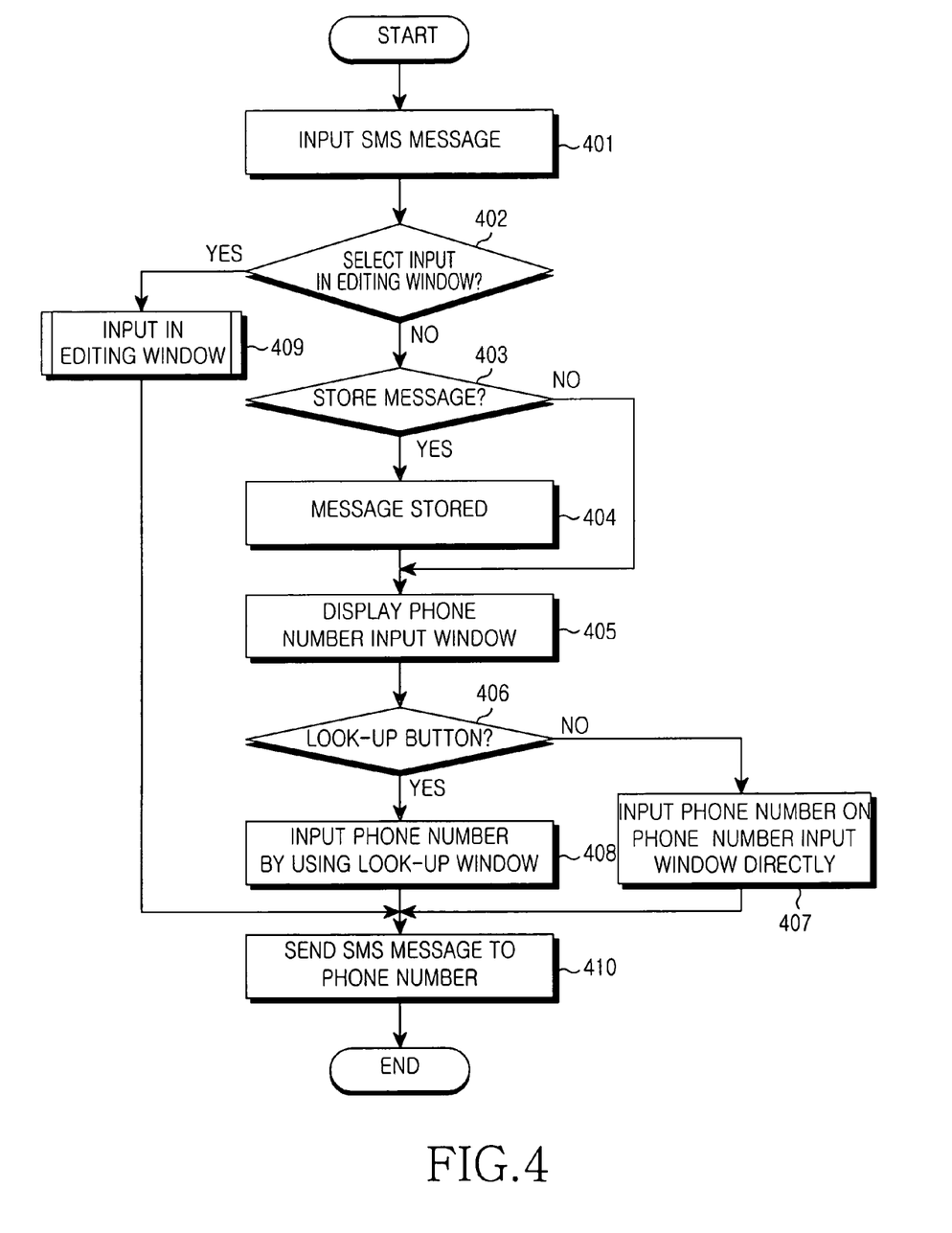
FIG. 4 is a flow chart diagram showing a method for inputting a phone number of a given recipient upon SMS transmission of the mobile phone in accordance with a preferred embodiment of the present invention.

Referring now to FIG. 4, the operating procedure for inputting a phone number of a given receiver in SMS transmission of the mobile phone in accordance with a preferred embodiment of the present invention.

In SMS transmission using the mobile phone of the present invention, the input procedure of a phone number of a recipient may be incorporated to supplement the conventional input procedure of phone number as disclosed in FIG. 3. For this embodiment of the phone number input procedure, the user may first be asked in FIG. 4 as to whether a direct input method of the present invention will be selected or not, and depending upon a result of the user's selection, the user may utilize either one of the conventional input method and the input method of the present invention as desired. However, it should be noted that the input method of phone number according to the present invention is also intended to operate by itself without such incorporation with the conventional input method. As such, the present invention also makes it possible for the mobile phone to perform the SMS messaging service only via inputting a phone number of a recipient by means of a direct input of the number within a message input window.

Referring again to FIG. 4, more detailed explanation is made to the input method of phone number of the given recipient in SMS transmission of the mobile phone according to the present invention. The mobile phone receives an SMS message prepared by the user in step 401 of FIG. 4. An example of such a message is shown in FIG. 1A. After entering the SMS message, it is determined in step 402 whether a direct input method of phone number on a message editing window will be selected ("yes" in step 402) or a conventional input method of phone number will be selected ("no" in step 402). Such a determination in step 402 may be effected by making confirmation on the user's selection through a newly activated window, or by using a predetermined short key. Explaining in more detail, in the conventional input method, a "Confirmation" key is depressed after entering the SMS message, and then a window with a message reading "Store Message?" is activated to confirm whether the inputted SMS message is to be stored in a memory for later use (as shown in FIG. 1B). However, in the present invention, a new window is activated to confirm whether or not a direct input function is selected after depressing a "Confirmation" key, so as to determine whether the direct input or conventional method is selected in step 402. In the meantime, explaining the selection method by a short key, a given one of a plurality of keys in the mobile phone is set to a selection code for designation of "direct input method of phone number in message editing window", so that the user can make a selection by depressing a key corresponding to the above code. Here, in case that the user depresses the "Confirmation" key only, the conventional method of inputting phone number will be carried out as seen in steps 403 to 408 of FIG. 4. Further, it would be possible to add to the mobile phone a new key corresponding to a code that implements the selection method using the short key.

Depending on the result of the above-mentioned selection in step 402, if the conventional method of phone number input window has been selected, then the control proceeds to the procedure to perform the steps as shown in FIG. 3. Describing in more detail, it is determined in step 403 whether the SMS message entered by the user is to be stored, and then the message is stored in step 404 if it is confirmed to store the message in the preceding step 403. If it is confirmed not to store the message in the preceding step 403 the control proceeds to a next step 405 without storing the message. Then, a phone number input window is activated on display in step 405. Further, the inputting of phone number through the phone number input window can be carried out in two ways, that is, in the steps 406 and 408 with a look-up window using a "Look-up" key or in step 407 with a direct input of phone number onto the phone number input window.

Meanwhile, in case where the direct input method of phone number in the message editing window has been selected as a result of the step 402, the phone number is inputted through a direct input procedure in the message editing window, in step 409. More detailed description to this procedure will be made later with reference to FIG. 5. As a result, the phone number of the specified recipient in the mobile phone may be inputted utilizing either one of the phone number input through the look-up window (step 408), the direct input of phone number into the phone number input window (step 407) and the direct input of phone number on the message editing window (step 409), to which phone number the SMS message is then transmitted in step 410.

Figure 5:
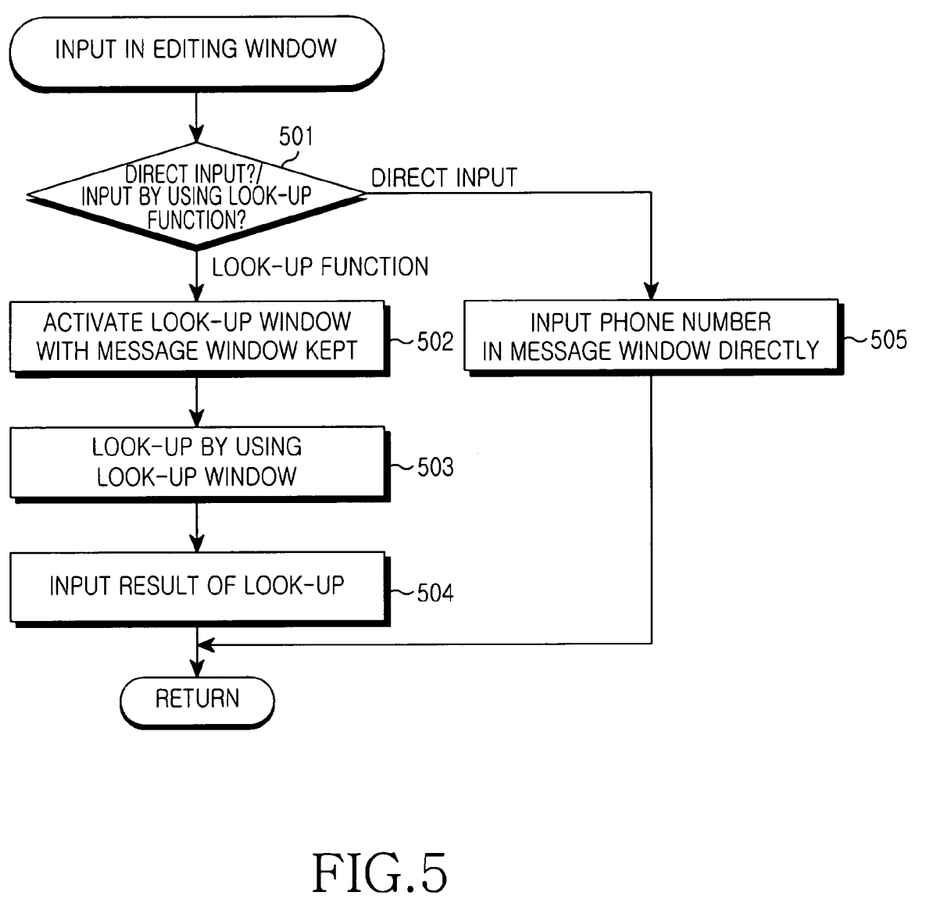
FIG. 5 is a flow chart diagram showing a method for directly inputting a phone number of the recipient upon using SMS function of the mobile phone in accordance with a preferred embodiment of the present invention.

FIG. 5 is a flow chart diagram showing a method for implementing a direct input procedure of phone number of the receiver upon using SMS function of the mobile phone in accordance with a preferred embodiment of the present invention.

The direct input method (step 409) of phone number in the message editing window is at first implemented with selection of the direct input function of phone number in step 501. That is to say, when the direct input of phone number in the message editing window is selected in step 409, it is then selected in step 501 whether it is desired to directly input the number in the message editing window or input the number via a "look-up" function.

The first embodiment of a direct input method of phone number in the message editing window is to give a new identification function to a special character used for entering an SMS message when selecting the direct inputting in the message editing window in the step 402 of FIG. 4. In the embodiment of the present invention, the telephone number is suggested by way of an example, it is also possible to use other identification, e.g., e-mail. Describing in more detail, a new definition is assigned to special characters such as '#', '/', '*', etc. to give a new ASCII code value thereto, and then, using the new ASCII code value, the control is made to identify any other numerals or characters following the corresponding special characters as a phone number or an e-mail address other than the SMS message. Thus, in case that the direct input in the message editing window is selected as aforementioned, the ASCII code value of the corresponding special character is adapted to be different from the conventionally defined ASCII code value so that it can be used as a new identifier.

For example, a special key assignment can be made in such a way that the '#' key may have a new ASCII code value designating input of a user ID (or address) for a phone book function, the '&' key may have a new ASCII code value designating input of a group phone number, the '/' key may have a new ASCII code value designating input of a user's phone number, and the '*' key may have a new ASCII code value designating input of an e-mail address of a recipient. Thus, an SMS message is entered according to the procedure as shown by way of example in step 401 of FIG. 4 and then it is selected a direct input of phone number into the message editing window in step 409. Next, in case where keys '#12' are entered, the input SMS message is transmitted to a phone number corresponding to a user ID '12' in a phone book of the mobile phone. This example corresponds to selection of a direct input in step 501 and direct input of the number in step 505

In a similar way, an SMS message is entered according to the procedure as shown by way of example in step 401 of FIG. 4 and then it is selected a direct input of phone number in the message editing window in step 409. Next, in case where keys '/0111234567' are entered, the input SMS message is transmitted to a phone number '011-123-4567'following the key '/'. Likewise, in case of '*aaa@abab.abc', the SMS message is to be transmitted to the e-mail ID following the key '*'. This also corresponds to step 505 of FIG. 5. In addition to these examples, other new identifiers may be applied to designate a specified group or a specific name of mobile subscriber.

The second embodiment of a direct input method of phone number to the message editing window according to the present invention is to render a scroll window of icon form so that the input is distinguished complying to the corresponding icons, when selecting the direct input in the message editing window in the step 402 of FIG. 4.

Figure 6A:
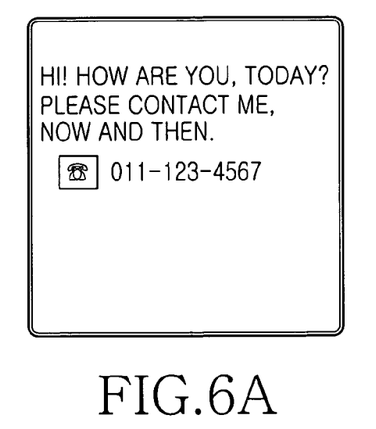
FIGS. 6A to 6C illustrate a series of display windows presented in the direct input procedure through a scroll window on a message editing window for inputting a phone number of the recipient upon using SMS function of the mobile phone in accordance with a preferred embodiment of the present invention.
Figure 6B:
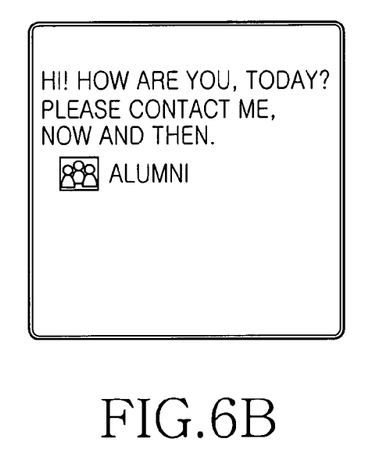
Figure 6C:
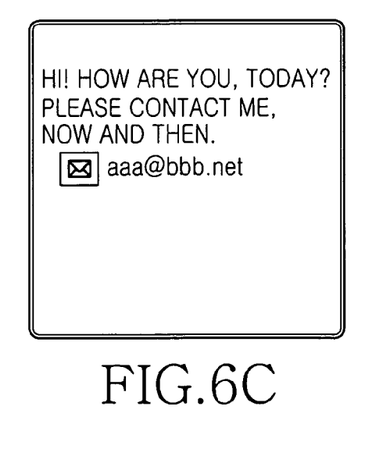

FIGS. 6A to 6C illustrate by way of example a series of display windows presented in the direct input procedure through such a scroll window in a message editing window for inputting a phone number of the receiver upon using SMS function of the mobile phone in accordance with a preferred embodiment of the present invention. Such a scroll window may be accessed by depressing an assigned key FIG. 6A shows inputting of a phone number using a telephone icon, FIG. 6B shows inputting of a group contact using an icon for a predetermined grouping, and FIG. 6C shows inputting of an e-mail address using an icon for e-mailing.

Having described heretofore the above two embodiments of the present invention, in particular, in conjunction with the direct input procedure (step 505) of phone numbers in the message editing window, the user may alternatively select to utilize a searching function, i.e., "Look-up" key as a method for directly inputting the phone numbers in the message editing window (step 501).

Figure 7A:
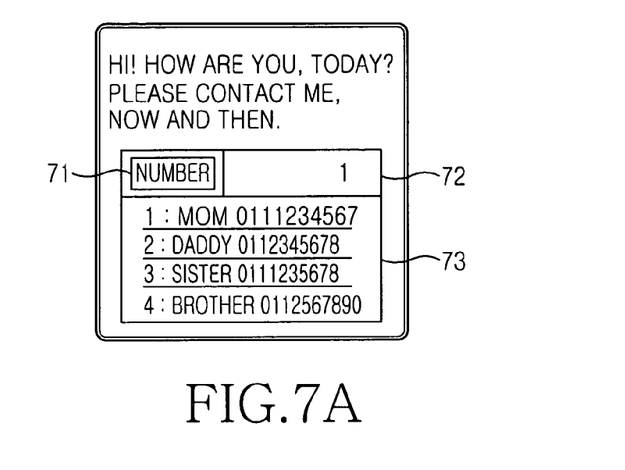
FIGS. 7A to 7C illustrate a series of searching (Look-up) windows presented on the message editing window for inputting a phone number of the recipient upon using SMS function of the mobile phone in accordance with a preferred embodiment of the present invention.
Figure 7B:
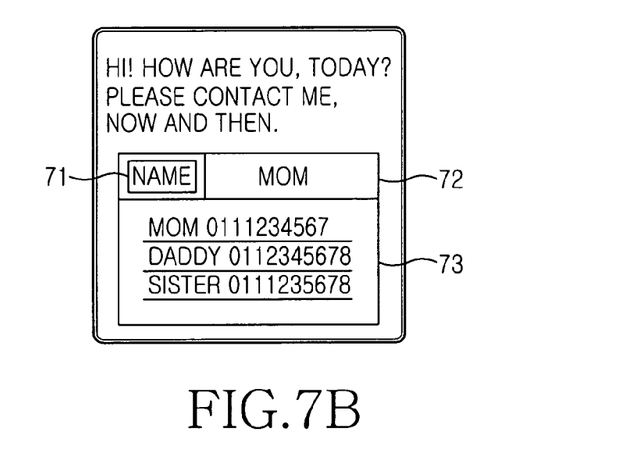
Figure 7C:
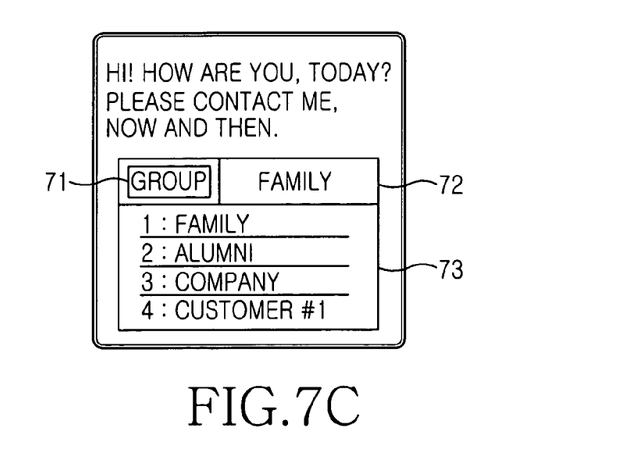

FIGS. 7A to 7C illustrate, by way of example, three similar types of phone number searching (Look-up) windows preferably presented on the message editing window for inputting phone numbers of the receiver upon using SMS function of the mobile phone in accordance with a preferred embodiment of the present invention. FIG. 7A shows the inputting of a phone number by using a predetermined short key number through the phone number searching window, FIG. 7B shows the inputting of a phone number by using a name of receiver in the phone number searching window, and FIG. 7C shows the inputting of phone numbers by grouping of receivers through the phone number searching window.

Describing this input procedure of phone numbers in more detail, if inputting by the "Look-up" function is selected in step 501, then the message editing window is kept activated as it is and then a new layer of phone number look-up window is activated in step 502. Here, the activated phone number look-up window is divided into three sections; the first one is a window 71 for indicating by which look-up category the look-up function is to be executed, e.g. such as short key number, name of receiver, or group of receivers, etc., the second one a window 72 for inputting an intended searched word of the selected look-up category and the third one a window 73 for displaying the result of searching, as illustrated in FIGS. 7A to 7C. The different categories may be changed, for example, by using a predetermined key on the phone. Scrolling and selection of items may be performed using arrows and selection keys.

Therefore, a searching of phone number is performed in step 503 using the activated phone number look-up window and the searched result, i.e. the phone number of the SMS receiver is inputted (step 504) next to the SMS message entered beforehand in the message editing window, as shown in FIGS. 7A–7C.

As a result of this operation, it is noted that the present invention makes it possible to input a desired phone number with a message editing window activated, so that the user can confirm the inputted phone number and correct the same as desired even after inputting the phone number. Further, although the above description of the preferred embodiment shows the method of selectively using the conventional input method of phone numbers or the direct input method in the message editing window according to the present invention, the input method of the present invention may be utilized for inputting a phone number of a given recipient upon using SMS service in the mobile phones, by means of using only the direct input procedure in the message editing window. In the embodiment of the present invention, the telephone number is suggested by way of an example; it is also possible to use other identification, e.g., e-mail.

As apparent from the foregoing description, the present invention has an advantage in that upon using the messaging service, the user may correct the previously inputted SMS message in the phone number input window. That is to say, the user can conveniently make a correction or re-entry of the inputted message by allowing a direct input of the phone number of a receiver in the message editing window even after inputting an address of the receiver, for instance, in SMS transmission with the mobile phone.

Moreover, recently, as the mobile subscribers tend to use the messaging services more frequently than in the past years in the field of the mobile communication and most of the users prefer to use the messaging service with longer messages and a larger number of addresses of receivers upon using it, it may be essentially necessary for the user to make more prompt and convenient input of messages and phone numbers. Thus, according to the invention the user may replace the troublesome input procedure of entering an entire address of message receivers with an input of only one or two characters, thus the present invention provides frequent users of the messaging service with much more convenient and prompt means for sending the messages.

The present invention may be implemented using a software program, which may be stored in a recording medium such as a CD-ROM, RAM, floppy disk, hard disk, optical disk, etc. and can be read with a computer using a conventional way.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for inputting an address of a recipient in a messaging service, comprising the steps of:
    (a) determining whether a direct inputting of the address of the message recipient on a message editing window is selected by a user of the messaging service; and
    (b) if it is determined that the direct inputting of the address in the message editing window has been selected in the step (a), entering the address of the message recipient directly into the message editing window activating with the message editing window activated.

2. The method for inputting an address of a recipient in a messaging service according to claim 1, further comprising the step of (c) closing the message editing window and activating a new input window for entering the address of the message recipient, if it is determined that the direct inputting of the address in the message editing window has been not selected in step (a).

3. The method for inputting an address of a recipient in a messaging service according to claim 1, wherein in the step (a) a window is activated to confirm whether the user selects the direct inputting of the address of the message receiver in the message editing window, after the user has entered the message to be transmitted using the messaging service.

4. The method for inputting an address of a recipient in a messaging service according to claim 1, wherein in the step (a), the user's selection to the direct inputting of the address of the recipient in the message editing window is determined by whether or not a predetermined ASCII code value has been inputted, after the user enters the message to be transmitted using the messaging service.

5. The method for inputting an address of a recipient in a messaging service according to claim 4, wherein a new input key is provided to enter the predetermined ASCII code value for a selection to the direct inputting of the address of the receiver in the message editing window.

6. The method for inputting an address of a recipient in a messaging service according to claim 1, wherein the step (b) further comprises:
  (d) determining a type is requested by the user for the direct input of the address of the recipient in the message editing window;
  (e) if the requested type determined in the step (d) by the user for the direct input of the address is an input by a look-up function, activating a look-up window as a new window within the message editing window, and inputting the address of the recipient selected by the user into the message editing window; and
  (f) if the requested type determined in the step (d) by the user for the direct input of the address is an input by a short key function, causing the address of the recipient to be inputted directly in the message editing window within the message editing window.

7. The method for inputting an address of a recipient in a messaging service according to claim 6, wherein the look-up window of the step (e) is provided with a first display section for representing a look-up category, a second display section for entering a search parameter and a third display section for displaying a result of searching.

8. The method for inputting an address of a recipient in a messaging service according to claim 6, wherein the inputting by the short key function of the step (f) comprises executing new ASCII code value for a special character used on entering the message, wherein the special character is utilized as an identifier for inputting the address of the recipient following the special character.

9. The method for inputting an address of a recipient in a messaging service according to claim 8, wherein as the identifier of the address of the recipient a first special character key designates inputting of a short key for a phone book, a second special character key designates inputting of an address of a group of recipients, a third special character key designates inputting of a phone number address by the user, and a fourth special character key designates inputting of an e-mail address by the user.

10. The method for inputting an address of a recipient in a messaging service according to claim 6, wherein the inputting by the short key function of the step (f) comprises generating an icon to be utilized as an identifier of the address of the recipient, displaying the icon, and causing the icon to be selected in a scrolled way.

11. The method as in claim 1, wherein the address of the recipient is comprised of one of a telephone number and an e-mail address.

12. A method for inputting an address of a recipient in a messaging service, comprising the steps of:
  (a) after a user of the messaging service has entered a message, determining a type of a direct input requested by the user for inputting of the address of the recipient in a message editing window;
  (b) if the requested type determined in step (a) by the user for the direct input of the address is an input by a look-up (searching) function, activating an address look-up window as a new display layer while still activating the message editing window, and inputting the address of the recipient selected by the user directly into the message editing window; and
  (c) if the requested type determined in the step (a) by the user for the direct input of the address is an input by a short key function, causing the address of the recipient to be inputted directly into the message editing window subsequently to the inputted message utilizing the short key, while still activating the message editing window.

13. The method for inputting an address of a recipient in a messaging service according to claim 12, wherein the look-up window of step (b) is provided with a first display section for representing a looked-up category, a second display section for entering a search parameter and a third display section for displaying a result of searching.

14. The method for inputting an address of a recipient in a messaging service according to claim 12, wherein the inputting by the short key function of the step (c) comprises executing a new ASCII code value for a special character used on entering the message, wherein the special character is utilized as an identifier for inputting the address of the recipient following the special character.

15. The method for inputting an address of a recipient in a messaging service according to claim 14, wherein as the identifier of the address of the recipient a first special character key designates inputting of a short key for a phone book, a second special character key designates inputting of an address of a group of recipients, a third special character key designates inputting of a phone number address by the user, and a fourth special character key designates inputting of an e-mail address by the user.

16. The method for inputting an address of a receiver in a messaging service according to claim 12, wherein the inputting by the short key function of the step (c) comprises generating an icon to be utilized as an identifier of the address of the recipient, displaying the icon, and causing the icon to be selected in a scrolled way.

17. The method as in claim 12, wherein the address of the recipient is one selected from a telephone number and an e-mail address.

18. A computer-readable recording medium including a control program for use in a messaging service system provided with a processor, the control program being adapted to execute a first function for determining whether a selection is made for direct inputting of an address of a message recipient in a message editing window; and a second function for allowing a user to enter an address of a message recipient directly into a message editing window with the message editing window activated, if it is determined that the selection was made to the direct inputting of the address of message recipient in the message editing window.

19. The computer-readable recording medium according to claim 18, wherein the control program further comprises a program to execute a third function for closing the message editing window and activating a new input window for the address of recipient, so as to allow inputting of the address, if it is determined that no selection was made to close the message editing window and activate the new input window for the address of the recipient.

* * * * *